2,818,419
Patented Dec. 31, 1957

2,818,419

PROCESS FOR PRODUCING LOW VISCOSITY PETROLATUM OXIDATE

John K. McKinley, Gordon S. Bright, and Roy F. Nelson, Port Arthur, Tex., assignors to The Texas Company, New York, N. Y., a corporation of Delaware No Drawing. Application September 30, 1955
Serial No. 537,893

3 Claims. (Cl. 260—451)

This invention relates to a method for oxidizing high molecular weight petrolatum so as to produce high ester content, low viscosity oxidates which are excellent additives for mineral oils to produce specialty lubricants.

This application is a continuation-in-part of our copending application, Serial No. 250,962, filed October 11, 1951, and now abandoned.

Oxidation of high molecular weight hydrocarbons with air or oxygen results in the production of a heterogeneous mixture of oxygenated compounds. Not only are many different types of oxygenated hydrocarbons produced, but oxygenates of a wide molecular weight range result because the oxidation is accompanied by substantial chain degradation even when a relatively close boiling charge material is employed. The complexity of the oxidation product is apparent from a brief review of the types of oxygenates obtained. Acids, alcohols, aldehydes and ketones are all produced directly in the oxidation reaction. Acids are ordinarily the main reaction product, with hydroxy hydrocarbons constituting the second largest product. Further oxidation of the acids leads to the production of hydroxy acids and keto acids. In addition, at the oxidation temperature ordinarily employed, which is in the range of 200 to 400° F., a number of secondary reaction products are formed; in particular there is a substantial amount of thermal esterification of organic acids with hydroxy acids and with alcoholic components of the reaction mixture.

Despite the extensive nature of the prior art on wax oxidation, both the technical and patent literature are deficient in teaching how to control the oxidation reaction so as to produce a product oxidate characterized by both high ester content and low viscosity. The prior art discloses that high ester content oxidates characterized by ratios of Neut. No. to Sap. Nos. between 0.25 and 0.5 are normally produced in the oxidation reaction but is devoid of any teaching how oxidates containing Neut. No. to Sap. No. ratios less than 0.2 can be produced or how the viscosity of the high ester content oxidates can be controlled as desired. The subject application provides a method for producing high ester content oxidates characterized by Neut. No. to Sap. No. ratios less than 0.2 and Saybolt Universal viscosities at a temperature of 210° F. less than 750. In our commonly assigned patent, U. S. 2,705,241, there is disclosed a process for producing petrolatum oxidates whose Saybolt Universal viscosities at 210° F. are well above 5000. High ester content, low viscosity wax oxidates produced in accordance with this invention are useful as lube oil additives and impart corrosive resistance, emulsification, antirust and antioxidant properties to lubricating oil fractions.

In accordance with the process of this invention, wax oxidates of high ester content and low viscosity are obtained by reacting petrolatum with air in the presence of a catalyst at an air velocity of 0.1 to 1.5 feet per second at a temperature between 300 and 380° F. and at atmospheric pressure. The critical features are choice of charge material, use of catalyst, maintenance of prescribed temperature and pressure conditions, and use of an air velocity within the prescribed region. Employing the prescribed conditions, petrolatum oxidation yields an oxidate characterized by a ratio of Neut. No. to Sap. No. less than 0.20 and a Saybolt Universal viscosity of 210° F. less than 700.

The discovery that high ester content-low viscosity oxidates can be prepared by proper selection of charge stock, use of catalyst and critical control of temperature, pressure and air velocity is a significant advance in the field of wax oxidation. The process of this invention results in the formation of low viscosity, high ester content oxidates which are excellent additives for lubricant compositions wherein anti-corrosive, anti-oxidant and emulsification properties are required. The high ester content-low viscosity oxidates produced in accordance with this invention are excellent additives for naphthene-base oils such as marine engine oil and rock drill lubricants to which they impart desired anti-corrosive, emulsification and anti-oxidant properties.

The selection of charge material has a significant and substantial effect on the type of oxidate produced. Petrolatum which is obtained by the solvent dewaxing of residual oils is the requisite charge material to produce high ester content-low viscosity oxidates. Petrolatum is a microcrystalline wax containing a large content of isoparaffins, cycloparaffins and aromatics and has an average chain length between 35 and 50 carbon atoms.

In general, the production of high ester content, low viscosity oxidate is effected in an aluminum-lined reactor in the presence of a catalyst. A particularly preferred catalyst is potassium permanganate which is charged to the reactor in an aqueous solution together with the charge petrolatum. A potassium permanganate catalyst of this nature is employed in amounts ranging from 0.1 to 1.0 percent of the total hydrocarbon charge; 3 to 10 percent aqueous solutions of potassium permanganate are ordinarily used to introduce the required catalyst into the reaction zone. Excellent distribution of the potassium permanganate throughout the petrolatum is obtained during the induction period during which air is blown through the reaction mixture as it is raised to the specified temperature range. The water evaporates during the induction period, leaving the catalyst distributed throughout the charge very uniformly. Although potassium permanganate in the form of an aqueous solution is the preferred oxidation catalyst, oil-soluble catalysts such as manganese stearate, zinc stearate, manganese and zinc salts of previously oxidized wax fractions may also be employed in the process of this invention to produce a high ester content, low viscosity oxidate.

The oxidation temperature must be maintained between 300 and 380° F. in order to produce a high ester content, low viscosity oxidate. The preferred temperature range is 320 to 350° F. Control of reaction temperature is ordinarily effected by indirect heat exchange. An alternative means of temperature control involves continuous introduction of water into the reaction zone, which results in removal of exothermic heat of reaction by evaporative cooling.

Atmospheric or sub-atmospheric pressure is prescribed to produce a high ester content, low viscosity oxidate. It is important to maintain the pressure below about 20 pounds per square inch gauge in the process of this invention because higher pressures result in the production of a more acid-like oxidate.

The final and most decisive factor in the process of this invention is the speed at which air is passed through the petrolatum during oxidation. It has been discovered that the production of a high-ester, low viscosity petrolatum oxidate requires the use of an air velocity between 0.1 and 1.5 feet per second at the prescribed temperature and pressure. The prescribed 0.1 to 1.5 feet per second is obtained using an air rate of 2 to 10 standard cubic feet per pound of hydrocarbon per hour in a pilot unit operation holding a 150 pound of charge and an air rate of 0.5 to 5 cubic feet per pound per hour in a plant unit holding 3,000 pounds of charge. Thus, for both pilot and plant operation, the air rates fall in the range of 0.5 to 10 standard cubic feet per pound of hydrocarbon per hour, the plant air rate usually being about half of that required in pilot plant operation. The air velocity required for the production of a high-ester, low viscosity petrolatum oxidate is the same in both pilot and plant operation at similar temperature and pressure conditions and, accordingly, is the preferred method of measuring the rate at which air is passed through the petrolatum charge. Preferred air velocities fall between 0.1 and 1.0 feet per second.

The process of the invention is illustrated in detail in the following examples wherein petrolatums are oxidized in accordance with the process of the invention to yield high ester content-low viscosity oxidates. Example I illustrates the preparation of a high ester content-low viscosity oxidate from petrolatum.

*Example I*

There was charged to an aluminum reactor, which is 12 feet high, has an internal diameter of 10 inches and which is provided with heat exchange surface, 150 pounds of petrolatum obtained by centrifuge dewaxing of a refined residuum; the charge petrolatum had the following properties:

| | |
|---|---:|
| Flash, O. Cleve. ° F | 520 |
| Fire, Cleve. ° F | 590 |
| Visc. Say. Univ. at 210° F | 86.6 |
| Color T. R | ¼ |
| Melting point, ° F | 151.8 |
| Ash, percent | .008 |
| Sulfur, percent | .19 |
| Oil, percent (ASTM) | 13.39 |

There was also charged to the reactor an aqueous solution of potassium permanganate prepared by dissolving 0.6 pound of potassium permanganate in 10 pounds of water. Air blowing was initiated as soon as the total charge mixture was introduced into the reactor. The reaction mixture was rapidly heated to a temperature of about 350° F. by heat exchange in order to initiate the reaction. After the initiation of reaction was indicated by the evolution of heat, the reaction mass was cooled to an operating temperature of 330° F. The oxidation was effected at atmospheric pressure and at an air velocity of 0.78 foot per second equivalent to an air rate of 6 cubic feet of air per pound of petrolatum per hour in the pilot unit used. The reaction was continued at these conditions for a period of about 17½ hours, at which time the oxidate had reached a Neut. No. of 9.9 and a Sap. No. of 82. There was obtained a yield of approximately 86 percent oxidate on the basis of hydrocarbon charge. The product obtained had a Saybolt Universal Viscosity at 210° F. of 684 and was characterized by the following tests:

| | |
|---|---:|
| Neut. No | 9.9 |
| Sap. No | 82 |
| Ester No | 72.1 |
| Ratio Neut. No./Sap. No | .12 |
| Unsaponifiable, percent | 57.8 |
| Gravity, ° API | 19.4 |
| Flash, O. Cleve., ° F | 480 |
| Fire, Cleve., ° F | 540 |
| Visc. Say. Univ. at 210° F | 684 |
| Pet. melting point ° F | 144.2 |
| Ash, percent | .39 |

It will be noticed that the petrolatum oxidate produced in accordance with the process of this invention has a low viscosity and particularly high ester content. The oxidate has a ratio of Neut. No. to Sap. No. of .12, indicating the presence of about ten times as much ester as acid in the oxidate; it also has a Saybolt Universal viscosity at 210° F. of 684.

The effect of reaction conditions particularly air velocity, temperature and pressure on the oxidation of a 20.5° API gravity petrolatum having an oil content of 13.39 percent is shown in the following table wherein oxidation conditions are shown in the upper half of the table and the properties of the resulting petrolatum oxidates are shown in the bottom half of the table.

The critical nature of the prescribed operating conditions for producing a low viscosity, ester-type petrolatum oxidate is shown by the following data.

| | Influence of Operating Variables Upon Petrolatum Oxidate Properties | | | | |
|---|---|---|---|---|---|
| Run No | 1 | 2 | 3 | 4 | 5 |
| Oxidation Conditions: | | | | | |
| Temperature, °F | 330 | 330 | 360 | 250 | 250 |
| Pressure, p. s. i. a | Atm. | Atm. | Atm. | Atm. | 80 |
| Air Velocity, ft./sec | 0.78 | 2.6 | 4.0 | 3.5 | 0.65 |
| Air rate, S. C. F. H./Lb | 6 | 20 | 30 | 30 | 30 |
| Catalyst, Percent KMnO₄ | 0.4 | 0.4 | 0.4 | 0.4 | 0.4 |
| Time, hours | 17.5 | 6.25 | 5.5 | 12.5 | 2.75 |
| Tests on Oxidate: | | | | | |
| Neut. No | 9.9 | 26 | 2.7 | 27 | 48 |
| Sap. No | 82 | 126 | 66 | 79 | 101 |
| Neut. No./Sap. No. Ratio | 0.12 | 0.21 | 0.04 | 0.34 | 0.48 |
| Nonsaponifiable, Percent | 57.8 | 37.7 | 32 | 35.9 | 50.6 |
| Viscosity, SUV, at 210° F | 684 | 6,211 | 11,038 | 162.7 | 177.1 |

Run 1 in this table represents oxidation of petrolatum by the low viscosity, high-ester process of the subject application. Runs 2 and 3 show oxidation of petrolatum by the high viscosity, high-ester process of U. S. 2,725,241. Runs 4 and 5 show the effect of varying temperatures and pressures on the properties of a petrolatum oxidate.

In run 1 oxidation of petrolatum at 330° F., atmospheric pressure, an air velocity of 0.78 foot per second (6 cubic feet per pound per hour in the pilot unit) 0.4 percent catalyst concentration for 17.5 hours gave an oxidate having a Neut. No. to Sap. No. ratio of 0.2 and an SUV at 210° F. of 684. In run 2, using similar conditions with the exception of shorter contact times and an air velocity of 2.6 feet per second (20 cubic feet per pound per hour in the pilot unit) petrolatum oxidate having a Neut. No. to Sap. No. ratio of about 0.21 and an SUV at 210° F. of 6,211 was obtained. In run 3, at higher temperature and air velocity, the oxidate had a Neut. No. to Sap. No. ratio of 0.04 and an SUV at 210° F. of 11,038. Particularly striking is the effect of changing the air velocity from 2.6 feet per second to 4.0 feet per second on the SUS viscosity at 210° F. of the oxidate.

Runs 4 and 5 demonstrate the necessity of employing the prescribed temperature and pressure conditions in order to obtain a petrolatum oxidate characterized by high ester content and low viscosity. In run 4, in which temperature and air velocity are outside the claimed ranges, the oxidate has a low viscosity but the Neut. No. to Sap. No. ratio is well above the desired range for an oil-soluble, ester-type oxidate. In run 5, pressure and temperature are outside the claimed ranges and the resulting petrolatum oxidate has become much more acidic, having a Neut. No. to Sap. No. ratio of about 0.48, but its SUV at 210° F. of 177 marks it a low viscosity oxidate. Air velocity figures are dependent on temperature and pressure conditions employed whereas the air rate figures being expressed in standard cubic feet per lb. per hr. are independent of temperature and pressure conditions. The difference in air velocity figures between runs 3, 4 and 5 at constant air rates is caused by the difference in temperatures and pressures employed in these runs.

The oxidates produced in accordance with the process of this invention are soluble in lubricating oil fractions and impart corrosion resistance and anti-oxidant properties to lubricant fractions in which they are incorporated.

Obviously, many modifications and variations of the invention as hereinbefore set forth may be made without departing from the spirit and scope thereof and, therefore, only such limitations should be imposed as are indicated in the appended claims.

We claim:

1. A process for producing a low viscosity, high ester content petrolatum oxidate characterized by a Neut. No. to Sap. No. ratio less than 0.2 and by an SUV at 210° F. less than 700, which comprises reacting petrolatum with air in the presence of a catalyst at an air velocity between 0.1 to 1.5 feet per second at a temperature between 300 and 380° F. and at a pressure below 20 p. s. i. g.

2. A process according to claim 1 in which reaction is effected at an air velocity between 0.1 to 1.0 feet per second at a temperature between 320 and 350° F. and at atmospheric pressure.

3. A petrolatum oxidate derived by catalytic air oxidation of petrolatum at an air velocity from 0.1 to 1.5 feet per second at a temperature between 300 and 380° F. and at a pressure below 20 p. s. i. g., said oxidate being characterized by a Neut. No. to Sap. No. ratio less than 0.2, by an unsaponifiable content less than about 60% and a Saybolt Universal viscosity at 210° F. less than 700.

References Cited in the file of this patent

UNITED STATES PATENTS

| | | |
|---|---|---|
| 2,216,222 | Beller | Oct. 1, 1940 |
| 2,424,671 | Stossel | July 29, 1947 |
| 2,681,357 | McKinley | June 15, 1954 |
| 2,727,005 | McKinley et al. | Dec. 13, 1955 |